(12) United States Patent
Cherubini et al.

(10) Patent No.: US 9,099,121 B2
(45) Date of Patent: Aug. 4, 2015

(54) CURRENT-PERPENDICULAR-TO-PLANE MAGNETORESISTIVE READ SENSOR WITH GROOVED CONTACT AND FREE LAYERS

(71) Applicant: International Business Machines Corporation, Armonk, NY (US)

(72) Inventors: Giovanni Cherubini, Rueschlikon (CH); Simeon Furrer, Rueschlikon (CH); Jens Jelitto, Rueschlikon (CH); Mark A. Lantz, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/293,199

(22) Filed: Jun. 2, 2014

(65) Prior Publication Data

US 2014/0363699 A1    Dec. 11, 2014

(30) Foreign Application Priority Data

Jun. 6, 2013 (GB) .................................. 1310106.8

(51) Int. Cl.
*G11B 5/39* (2006.01)

(52) U.S. Cl.
CPC .............. *G11B 5/39* (2013.01); *G11B 5/3909* (2013.01); *G11B 5/3912* (2013.01);
(Continued)

(58) Field of Classification Search
CPC .............. G11B 5/10; G11B 5/11; G11B 5/33; G11B 5/39; G11B 5/3903; G11B 5/3906; G11B 5/3909; G11B 5/3912; G11B 5/3929; G11B 5/3932
USPC ............ 360/322, 324, 324.1, 324.11, 324.12, 360/324.2, 319
See application file for complete search history.

(56) References Cited

U.S. PATENT DOCUMENTS 5,390,061 A    2/1995    Nakatani et al.
7,295,406 B2    11/2007    Chattopadhyay et al.
(Continued)

FOREIGN PATENT DOCUMENTS

JP    2002269706 A    9/2002
WO    0011664 A1    3/2000

OTHER PUBLICATIONS

J. R. Childress, et al., "Magnetic Recording Read Head Sensor Technology," Comptes Redus Physique, vol. 6, Issue 9, Nov. 2005, pp. 997-1012.
(Continued)

*Primary Examiner* — Jefferson Evans
(74) *Attorney, Agent, or Firm* — Cantor Colburn LLP (57) ABSTRACT

A current-perpendicular-to-plane magnetoresistive read sensor includes a stack of layers extending along a stacking direction, and an edge surface parallel to the stacking direction that forms at least part of a bearing surface of the read sensor, the bearing surface designed to face a recording medium. The stack of layers includes a first contact layer, a ferromagnetic free layer whose magnetic orientation varies according to an applied magnetic field, above the first contact layer, a non-magnetic layer above the ferromagnetic layer, a ferromagnetic spin injection layer above the non-magnetic layer, and a second contact layer above the spin injection layer, such that a current can flow between the second contact layer and the first contact layer along a current-perpendicular-to-plane direction, parallel to the stacking direction. The stack of layers further includes a series of structures extending along a direction parallel to the bearing surface and perpendicular to the stacking direction.

13 Claims, 4 Drawing Sheets

(52) U.S. Cl.
CPC ..... *G11B 5/3929* (2013.01); *G11B 2005/3996* (2013.01); *Y10T 428/1114* (2015.01); *Y10T 428/1121* (2015.01); *Y10T 428/1129* (2015.01)

(56) References Cited

U.S. PATENT DOCUMENTS

| | | | |
|---|---|---|---|
| 7,502,193 | B2 | 3/2009 | Albrecht et al. |
| 7,564,656 | B2 | 7/2009 | Gurney et al. |
| 8,035,931 | B2 | 10/2011 | Zhao et al. |
| 8,279,548 | B2 * | 10/2012 | Tsuchiya et al. ............... 360/59 |
| 8,300,356 | B2 * | 10/2012 | Zhang et al. ............. 360/119.03 |
| 8,351,165 | B2 | 1/2013 | Carey et al. |
| 8,546,897 | B2 * | 10/2013 | Ohmori et al. ................ 257/421 |
| 2002/0131217 | A1 | 9/2002 | Nakashio et al. |
| 2006/0044703 | A1 * | 3/2006 | Inomata et al. ............ 360/324.1 |
| 2007/0217078 | A1 | 9/2007 | Neumann et al. |
| 2010/0110592 | A1 * | 5/2010 | Koui et al. ..................... 360/324 |
| 2011/0007431 | A1 | 1/2011 | Braganca et al. |
| 2011/0069413 | A1 | 3/2011 | Maat et al. |
| 2011/0096443 | A1 * | 4/2011 | Zhang et al. ............... 360/324.2 |

OTHER PUBLICATIONS

UK Intellectual Property Office, Application No. GB1310106.8, Patents Act 1977: Search Report Under Section 17(5), Mailed: Nov. 26, 2013, pp. 1-4.

Seigler, et al, "Current-Perpendicular-To-Plane Multilayer Sensors for Magnetic Recording," IEEE Transactions on Magnetics, May 2003, vol. 39, Issue 3, pp. 1855-1858.

* cited by examiner

CURRENT-PERPENDICULAR-TO-PLANE MAGNETORESISTIVE READ SENSOR WITH GROOVED CONTACT AND FREE LAYERS

PRIORITY

This application claims priority to Great Britain Patent Application No. 1310106.8, filed Jun. 6, 2013, and all the benefits accruing therefrom under 35 U.S.C. §119, the contents of which in its entirety are herein incorporated by reference.

BACKGROUND

The invention relates in general to the field of magnetoresistive read sensors and methods of fabrication thereof.

Figure 1:
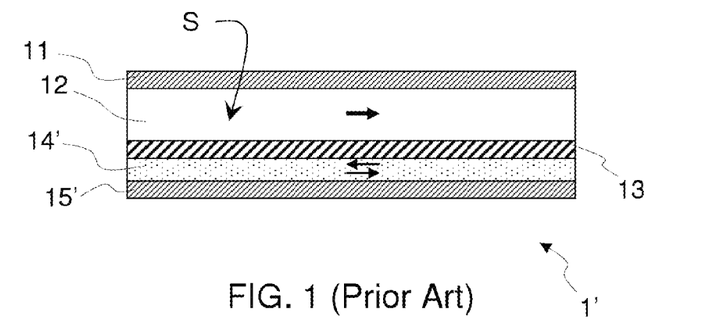
FIG. 1 is a 2D cross-sectional view of a simplified representation of a prior art current-perpendicular-to-plane (or CPP) magnetoresistive read sensor.

Magnetoresistive read sensors are known. FIG. 1 is a 2D cross-sectional view of a simplified representation of a prior art, current-perpendicular-to-plane (CPP) magnetoresistive read sensor 1'. This sensor 1' comprises a stack of layers 11-15, which extend along a stacking direction z. An edge surface S of the stack (parallel to the stacking direction z) is further parallel to and forms at least part of a bearing surface S of the read sensor. The bearing surface is designed to face a recording medium, in operation. More specifically, this stack of layers includes:

- A first contact layer 15;
- A free layer 14, ferromagnetic, whose magnetic orientation varies according to an applied magnetic field, as known. The free layer is above the first contact layer 15;
- A non-magnetic layer 13, above the ferromagnetic layer;
- A spin injection layer 12, ferromagnetic, above the non-magnetic layer; and
- A second contact layer 11 above the spin injection layer, such that a current can flow between the second contact layer 11 and the first contact layer 15 along the current-perpendicular-to-plane direction, i.e., parallel to the stacking direction z.

Reducing the pitch between adjacent readers such as depicted in FIG. 1, e.g., in a multi-channel tape drive, is highly desirable in order to enable applications such as adjacent track recording and/or electronic servoing. To date, the minimum pitch achievable between adjacent read transducers has been limited due to fabrication challenges.

There is therefore a need for new designs and fabrication methods of magnetoresistive read sensors that overcome these fabrication challenges.

SUMMARY

According to a first aspect, an embodiment of the present invention includes a current-perpendicular-to-plane (or CPP) magnetoresistive read sensor, comprising a stack of layers, wherein the stack of layers extends along a stacking direction of the stack; and an edge surface of the stack that is parallel to the stacking direction is further parallel to and forms at least part of a bearing surface of the read sensor, the bearing surface designed to face a recording medium, in operation, and wherein the stack of layers comprises: a first contact layer; a free layer, ferromagnetic, whose magnetic orientation varies according to an applied magnetic field, the free layer above the first contact layer; a non-magnetic layer above the ferromagnetic layer; a spin injection layer, ferromagnetic, above the non-magnetic layer; and a second contact layer above the spin injection layer, such that a current can flow between the second contact layer and the first contact layer along a current-perpendicular-to-plane direction, parallel to the stacking direction, and wherein the stack of layers further comprises a series of structures. Each of the structures of the series is formed in both the first contact layer and the free layer, an edge surface of each of the structures level with the edge surface of the stack; and the series of structures extends along a direction that is parallel to the bearing surface and perpendicular to the stacking direction.

In embodiments, the structures of the free layer and the first contact layer are defined by grooves, each having a main direction of extension that is: perpendicular to the stacking direction; and transverse, preferably perpendicular, to the bearing surface.

Preferably, the grooves are formed through both the first contact layer and the free layer, at least up to the non-magnetic layer, whereby the structures comprise, each, a portion of the contact layer and a portion of the free layer.

In preferred embodiments, a depth of the grooves extends through both the first contact layer and the free layer, at least partly into the non-magnetic layer.

In embodiments, the sensor is a CPP tunneling magneto resistive read sensor, and the non-magnetic layer is a tunnel barrier layer, electrically insulating.

In other embodiments, the sensor is a CPP giant magneto resistive read sensor and the non-magnetic layer is electrically conducting.

In embodiments, the read sensor is a tape read sensor, the bearing surface being a tape bearing surface.

In other embodiments, the read sensor is a hard drive read sensor, the bearing surface being an air bearing surface.

Preferably, the read sensor further comprises additional layers, contiguous or parallel with layers of the stack, including at least two shield layers, with at least one of the shield layers on each side of the stack of layer, and parallel therewith.

In embodiments, the stack of layers is a first stack of layers, the read sensor further comprising: a second stack of layers, having structures similar to structures of the first stack of layers; and at least three shield layers, wherein, the first stack of layers and the second stack of layers are superimposed, the structures of the first stack shifted with respect to structures of the second stack along the direction parallel to the bearing surface and perpendicular to the stacking direction, at least one of the shield layers on each side of each of the first and second stacks, and parallel therewith.

Preferably, the read sensor comprises only one shield layer between the first stack and the second stack.

In preferred embodiments, the read sensor comprises several stacks of layers, each structured as the stack of layers, the several stacks arranged as a linear array of stacks of layers or, preferably, as two superimposed linear arrays of stacks of layers, the structures of the first of the linear arrays shifted with respect to structures of the second one of the two arrays, along the direction parallel to the bearing surface and perpendicular to the stacking direction.

According to another aspect, the present invention is embodied as a method of fabrication of a read sensor according to any one of the above embodiments, the method comprising: providing a stack of layers, wherein: the stack of layers extends along a stacking direction of the stack; and an edge surface of the stack that is parallel to the stacking direction is further parallel to and forms at least part of a bearing surface of the read sensor, the bearing surface designed to face a recording medium, in operation, and wherein the stack of layers comprises: a first contact layer; a free layer, ferromagnetic, whose magnetic orientation varies according to an applied magnetic field, the free layer above the first contact layer; a non-magnetic layer above the ferromagnetic layer; a spin injection layer, ferromagnetic, above the non-magnetic layer; and a second contact layer above the spin injection layer, such that a current can flow between the second contact layer and the first contact layer along a current-perpendicular-to-plane direction, parallel to the stacking direction; and forming a series of structures that extend along a direction that is parallel to the bearing surface and perpendicular to the stacking direction, wherein each of the structures is formed in at least the first contact layer and the free layer, such that an edge surface of each of the structures remains level with the edge surface of the stack.

In embodiments, forming the structures comprises forming grooves, each having a main direction of extension that is perpendicular to both the bearing surface and the stacking direction, wherein the grooves are preferably formed through both the first contact layer and the free layer, a depth of the grooves extending at least up to the non-magnetic layer, the structures comprising, each, a portion of the contact layer and a portion of the free layer. Preferably, grooves are formed with a depth that extends at least partly into the non-magnetic layer.

Devices, apparatuses, and methods embodying the present invention will now be described, by way of non-limiting examples, and in reference to the accompanying drawings. Technical features depicted in the drawings are not necessarily to scale.

DETAILED DESCRIPTION

In reference to FIGS. 2 to 10, an aspect of the invention is first described, which concerns a current-perpendicular-to-plane (or CPP) magnetoresistive read sensor 1.

Like the device of FIG. 1, the proposed sensor 1 comprises a stack of layers 11-15, which extends along a stacking direction z. An edge surface S (parallel to the stacking direction z) is further parallel to and forms at least part of the bearing surface S. The latter is designed to face a recording medium, in operation. As in FIG. 1, the stack of layers comprises:

A first contact layer 15;

A free layer 14, ferromagnetic, above the first contact layer 15;

A non-magnetic layer 13, above the ferromagnetic layer;

A spin injection layer 12, ferromagnetic, above the non-magnetic layer; and

A second contact layer 11 above the spin injection layer. Here again, a current can flow between the second contact layer 11 and the first contact layer 15 along the current-perpendicular-to-plane direction, i.e., parallel to the stacking direction z.

As indicated above, reducing the pitch between adjacent readers such as in FIG. 1 remains difficult, due to fabrication challenges. To address this issue, it is proposed to design the read sensor, such that the stack of layers further comprises a series of structures 30. Namely, and as better seen in FIG. 2 or 4, each of the structures 30 is formed in both the first contact layer 15 and the free layer 14. An edge surface of each of the structures (i.e., the sole edge surface depicted in FIG. 2) is level with the edge surface S of the stack (coinciding with the plane of FIG. 2). The series of structures extends along a direction x that is parallel to the bearing surface S and perpendicular to the stacking direction z.

In other words, the above solution is to use a CPP design (the plane referred to in "current-perpendicular-to-plane" being the plane of the layers), wherein an edge surface S of the stack is parallel to the bearing surface, while providing structures 30 fabricated in-plane (the series of structures extends perpendicular to the stacking direction z). Such a design is remarkably advantageous in terms of fabrication process, as the structures can be formed by machining into the layers of the stacks, e.g., by grooving surfaces. With such a configuration, one is able to take advantage of a number of existing surface micro-machining techniques, to form structures in-plane, and in turn to reduce the pitch between the structures.

The width in the (x, y) plane of a single structure may be between 20 and 1000 nm. The width is a parameter that may scale with each new generation of products. For example, for tape read sensors: in 2013, a preferred width might be ~800 nm, in two years it may be 400 nm, then later 200, 100, etc. For drive read sensor applications, a preferred width would currently be in the range of 20-50 nm. Concerning now the height of the structures 30: preferred heights for layer 14 are in the 3-5 nm range, and for layer 15 between 2 and 5 nm, so that the total height of structures 30 is preferably in the range of 5 to 10 nm. The height of layer 15 is less critical than that of layer 14 and could in fact be larger than 5 nm.

Figure 2:
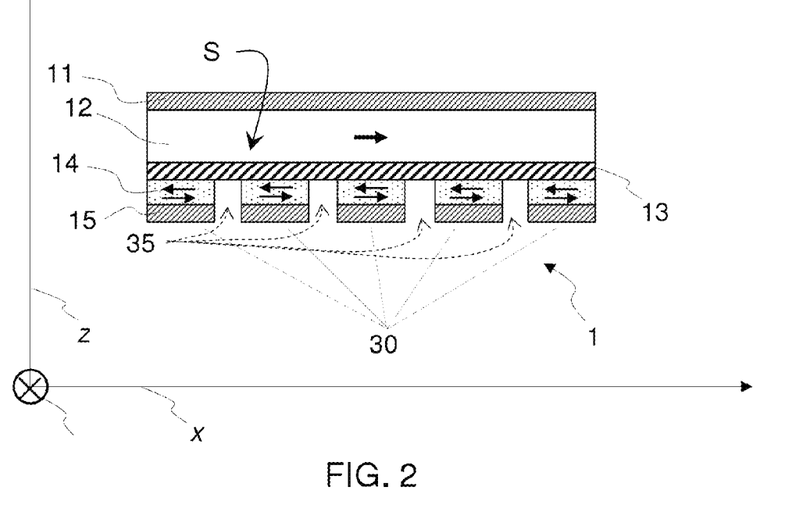
FIG. 2 is a 2D cross-sectional view of a simplified representation of a CPP magnetoresistive read sensor device, according to embodiments.
Figure 6:
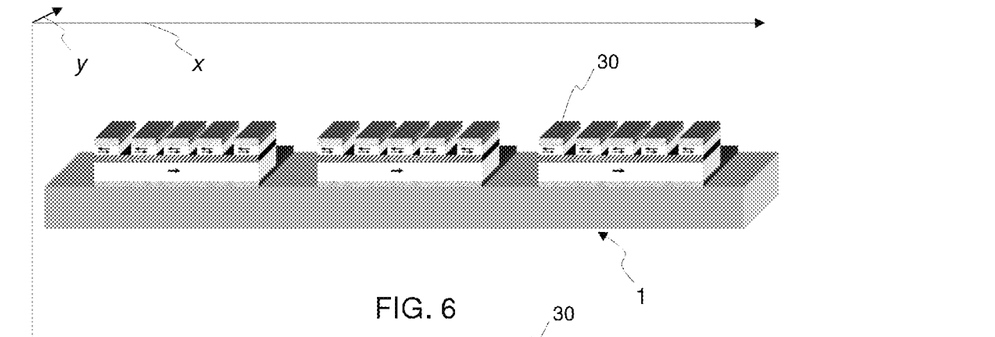
FIGS. 6 and 7 are each 3D views of a simplified representation of devices, wherein several structured stacks of layers are arranged as a linear array (FIG. 6), or as superimposed arrays (FIG. 7), according to embodiments.
Figure 7:
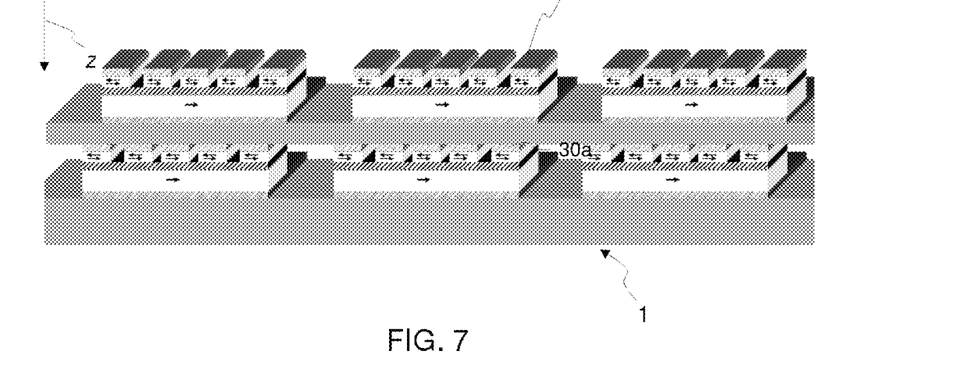

Meanwhile, the above solution is advantageous inasmuch as it requires fewer contacts: the upper contact layer 11, see e.g., FIG. 2, serves as a common contact for each of the five contact structures 30 depicted. The sensor 1 may in principle comprise any number of structures 30, e.g., ranging from 2 to 32. Still, the sensor may comprise an array of multiple segmented stacks, as depicted in FIGS. 6 and 7.

Embodiments described herein further have numerous advantages, be it in terms of shared hard bias magnets, as the skilled reader may appreciate, or potentially improved tolerances, thanks to accurate in-plane micro-machining techniques available.

The bearing surface is a tape bearing surface in the case of the tape read sensor or an air bearing surface in the case of a hard drive read sensor. It is in all case a magnetic recording medium bearing surface. The bearing surface is parallel to the edge surface S and could in fact coincide with it. Still, the edge surface needs not be exactly parallel to the bearing surface, since there could be some additional coating to prevent wear, facilitate the tape bearing, etc. Yet, for the purpose of the present description, it is considered that the edge surface forms the active part of the bearing surface (the stack of layers 11-15 provides the active functionality of the read sensor). Thus, both the edge surface and the bearing surface are referred to by the same reference S herein.

A "series of structures" means a number of structures coming one after another, that is, a succession of structures along the direction x, i.e., along and parallel to the bearing surface, and perpendicular to the stacking direction z. The structures are, each, formed in both the first contact layer 15 and the free layer 14. As per the above specifications, each structure 30 comprises a portion of the contact layer 15 and a portion of the free layer 14.

In the definitions above, one has a first layer in the (x, y) plane, which is "above", i.e., on top of, a second layer, which itself is "above" a third layer, etc. This defines a succession of layers, which are parallel but not necessarily immediately contiguous, since intermediate layers may be involved. In addition, additional layers may be provided in the (x, z) plane too, to cover the bearing surface, be it for protection purposes.

Figure 3:
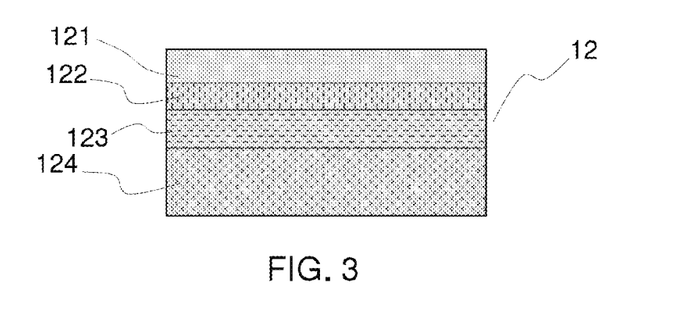
FIG. 3 is a 2D cross-sectional view of a simplified representation of a spin injection layer of the device of FIG. 2, as involved in embodiments.

Suitable thicknesses for the various layers involved are typically the following:

Layer 11, 15: ~5 nm;
Layer 12: ~10 nm;
Layer 13: 1-3 nm; and
Layer 14: 3.5-5 nm;

The spin-injection layer 12 typically decomposes into several sub-layers, as illustrated in FIG. 3. A spin injection layer TMR for HDD read heads may for instance comprise (using usual notations):

Layer 121: a pinned layer;
Layer 122: a Ru layer;
Layer 123: a FM (CO—Re) Layer; and
Layer 124: an AF layer (Pt—Mn or Ir—Mn) for exchange biasing.

In embodiments, the structures of the free layer 14 and the first contact layer 15 are defined by grooves 35. This way, structures 30 can be most simply obtained, with little processing overhead. Each groove 35 has a main direction y of extension that is perpendicular to the stacking direction z and transverse to the bearing surface S. Most practical is to provide grooves that have a main direction y of extension that is perpendicular to the bearing surface S. An advantage of forming grooves is that of reduced pitch. By minimizing the depth to which the grooves are formed, one is able to minimize the width of the groove and hence achieve readers that are very close together.

The grooves may be U-shaped, V-shaped, etc. Note that, instead of grooves, suitable structures 30 could be obtained by way of trenches and/or gaps, etc., or by combinations of grooves, trenches and gaps. The structures can be formed using one or more of the following techniques: wet etching, dry etching, ion milling, or lift off.

Figure 4:
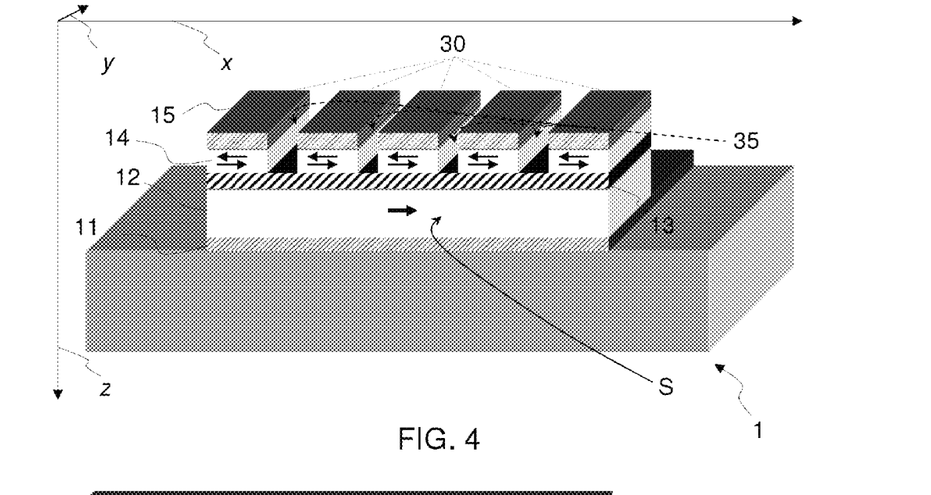
FIG. 4 is a 3D view of a simplified representation of the device of FIG. 2, according to embodiments.

Referring now more specifically to FIGS. 2 and 4, in embodiments, the grooves 35 are formed through both the first contact layer 15 and the free layer 14, at least up to the non-magnetic layer 13. Accordingly, the structures 30 comprise, each, a portion of the contact layer and a portion of the free layer. Independent bilayer structures 30 result, which are structurally independent from each other, although they are connected via the non-magnetic layer 13 or even the spin injection layer 12, depending on how deep the grooves 35 are. This allows for insulating the features from each other, at least in some extent.

The easiest way to ensure that the depth of the grooves goes fully through the first two layers 14, 15 is to reach into a third layer 13, i.e., beyond the free layer 14. The depth of the grooves may thus extend through both the first contact layer 15 and the free layer 14, and at least slightly into the non-magnetic layer, e.g., up to two nanometers and preferably between one and two nanometers, as the fabrication processes allow. A limit case is to have the grooves extending up to the spin-injection layer 12. However this would result in an increase the required etching time and may furthermore increase the width of the grooves and is hence not preferred. Preferred widths of the grooves are between 5 and 50 nm, more preferably between 5 and 25 nm and even more preferably in the range 5 to 10 nm. The narrower ranges are preferable from a function point of view, but the larger widths are easier to obtain from a fabrication perspective.

As touched earlier, the sensor 1 may be part of a CPP tunneling magneto resistive read sensor. In that case, the non-magnetic layer is a tunnel barrier layer, i.e., electrically insulating. The sensor 1 may also be part of a CPP giant magneto resistive read sensor, in which case the non-magnetic layer 13 is electrically conducting.

The read sensor 1 is preferably embodied as a tape read sensor (the bearing surface S being a tape bearing surface in that case). Still, it may notably be embodied as a hard disk drive read sensor, the bearing surface S being an air bearing surface in that case.

Figure 5:
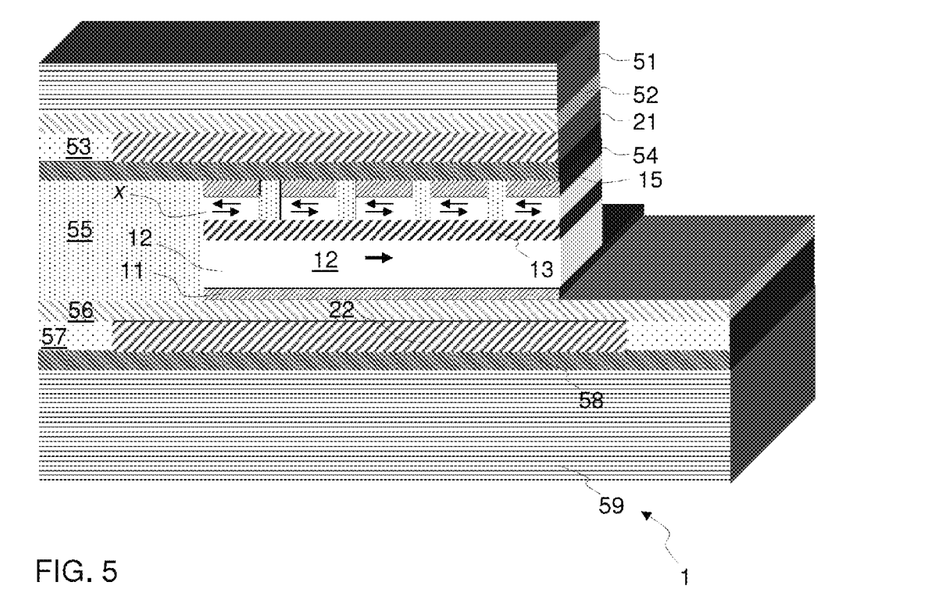
FIG. 5 is a 3D view of a more complete representation of a device such as depicted in FIG. 4, according to embodiments.
Figure 8:
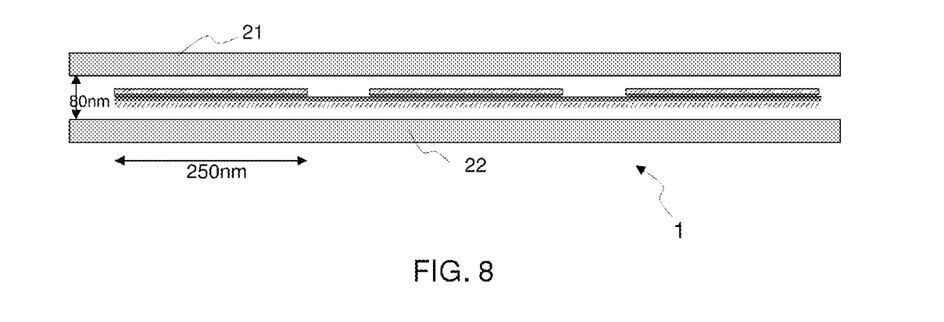
FIGS. 8, 9 and 10 are 2D cross-sectional views of possible interleaved configurations of devices according to embodiments of the invention.

Referring now to FIGS. 5, and 8 to 10, read sensor 1 typically comprises additional layers 21-23, 51-59, completing layers of the stack 11-15. These layers are contiguous or parallel with layers 11-15 discussed above. As seen in FIG. 5, one 55 of the additional layers may for instance be structured so as to be interdigitated with the structures 30. The additional layers shall notably include at least two shield layers (or shields) 21-23, at least one of the shields 21, 22 layers on each side of the stack of layers 11-15, and parallel therewith. The pitch between shield layers may be between 60 and 100 nm, and more particularly ~80 nm, as illustrated in FIG. 8. The distance between shields is a parameter that can be expected to scale to smaller dimensions with each new generation of products. For tape read sensors, it may for instance be in the range of 80 to 100 nm, scaling to smaller values for future generations. For hard disk drives, it may be in the range of 50 to 60 nm.

For completeness: layers 51 and 59 respectively denote a closure and a substrate (e.g., both in AlTiC); shields 21, 22 are typically made of permalloy; layers 52, 54 and 56-58 are electrical insulators (e.g., $Al_2O_3$); the contact 11, 15 are preferably metals (e.g., Ta).

Figure 9:
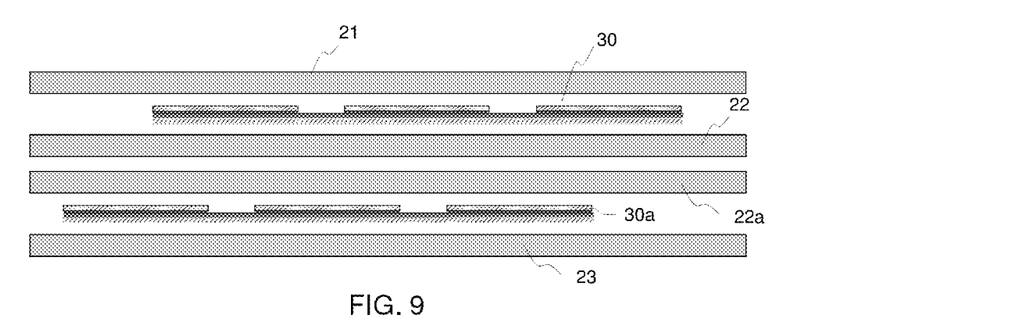
Figure 10:
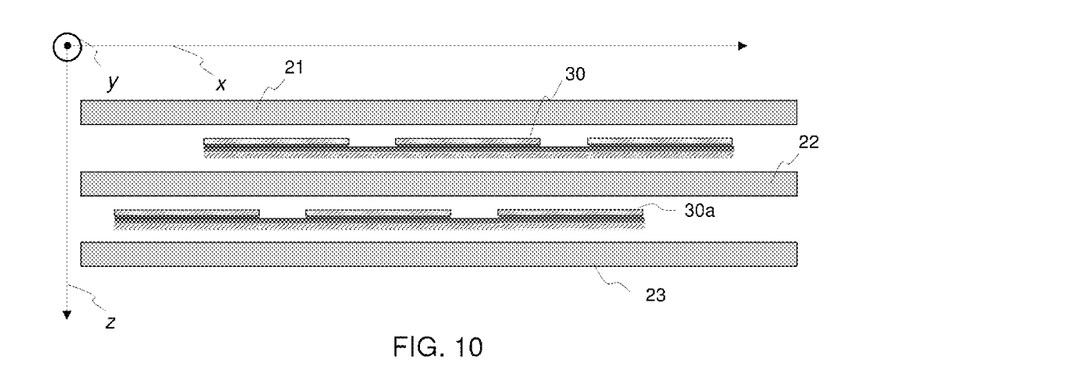

FIGS. 9, 10 show interleaved multi-channel segmented stacks that may advantageously be used in TMR readers. As seen, the read sensor may further comprise additional stacks of layers, having structures 30a similar to structures 30 of first stack of layers discussed above. Assuming that two stacks are present (as in FIG. 9 or 10), then at least three shields 21-23 need be provided. The first stack of layers and the second stack of layers are superimposed and the structures 30 of the first stack are shifted with respect to structures 30a of the second stack (shifted along direction x). The shift preferably corresponds to half the pitch along axis x, as shown. This advantageously allows for reading different tracks or different portions of a track. At least one shield is provided on each side of (each of) the first and second stacks, parallel therewith.

Advantageously, it can be realized that, instead of superimposing shield-sensor-shield structures (as in FIG. 9), only one shield 22 may be needed between the first stack and the second stack, which acts as a common center shield, as depicted in FIG. 10.

As stated earlier, a single stack may be structured to comprise typically between 2 and 32 structures, which already allow for reducing the pitch and reduce the number of required contacts. Now, referring to FIGS. 6 and 7, one way to increase the number of structured contacts 30 is to arrange several structured stacks of layers 11-15 such as described above as a linear array of stacks of layers, as shown in FIG. 6. In the same vein as in FIGS. 9-10, one may further arrange the structured stacks of layers as superimposed arrays of stacks, where the structures of a first array are shifted with respect to structures of an adjacent array, along the direction x (i.e., parallel to the bearing surface and perpendicular to the stacking direction).

According to another aspect, the present invention may be embodied as a method of fabrication of a read sensor such as described above. Basically, such a method comprises (in reference to FIG. 2, 4 or 5):

providing (or obtaining) a stack of layers 11-15, such as depicted in FIG. 1, i.e., not structured yet; and forming a series of structures 30 that extend along direction x, wherein each structure is formed in (at least) the first contact layer 15 and the free layer 14, such that the edge surface of the structures is level with the edge surface of the stack, i.e., the functional surface of the bearing surface.

Consistently with embodiments of the read sensor described earlier, the formation of the structures 30 preferably comprises the formation of grooves 35. The grooves are preferably formed through both the first contact layer 15 and the free layer 14, i.e., the depth of the grooves extends at least up to the non-magnetic layer 12, or possibly partly into the non-magnetic layer 12.

The above embodiments have been succinctly described in reference to the accompanying drawings and may accommodate a number of variants. Several combinations of the above features may be contemplated.

Some of the method embodiments described herein can be used in the fabrication of read sensors. The resulting sensors can be distributed by the fabricator in raw form or in a packaged form. In any case the sensors can then be integrated with other sensors, discrete circuit elements, and/or other signal processing devices as part of either (a) an intermediate product or (b) an end product.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials than those explicitly cited herein can be contemplated, e.g., the AF layer may comprise MnIr or PtMn, the pinned layer may comprise: CoFe, CoFeB, and/or NiFe, the tunnel barrier may comprise MgO, the non-magnetic spacer may comprise Cu, the substrate may comprise Si, etc.

The invention claimed is:

1. A current-perpendicular-to-plane magnetoresistive read sensor, comprising:
   a stack of layers, the layers extending along a stacking direction of the stack; and
   an edge surface of the stack that is parallel to the stacking direction and further parallel to and forms at least part of a bearing surface of the read sensor, the bearing surface designed to face a recording medium, in operation;
   the stack of layers further comprising:
   a first contact layer;
   a ferromagnetic free layer having magnetic orientation that varies according to an applied magnetic field, the free layer above the first contact layer;
   a non-magnetic layer above the ferromagnetic layer;
   a ferromagnetic spin injection layer above the non-magnetic layer; and
   a second contact layer above the spin injection layer, such that a current can flow between the second contact layer and the first contact layer along a current-perpendicular-to-plane direction, parallel to the stacking direction;
   wherein the stack of layers further comprises a series of structures, such that each of the structures of the series is formed in both the first contact layer and the free layer, an edge surface of each of the structures level with the edge surface of the stack, and the series of structures extends along a direction that is parallel to the bearing surface and perpendicular to the stacking direction; and
   wherein the structures of the free layer and the first contact layer are defined by grooves, each having a main direction of extension that is perpendicular to the stacking direction, and transverse to the bearing surface.

2. The sensor of claim 1, wherein the grooves are formed through both the first contact layer and the free layer, at least up to the non-magnetic layer, wherein the structures comprise, each, a portion of the contact layer and a portion of the free layer.

3. The sensor of claim 2, wherein a depth of the grooves extends through both the first contact layer and the free layer, at least partly into the non-magnetic layer.

4. The sensor of claim 1, wherein:
   the sensor is a CPP tunneling magneto resistive read sensor; and
   the non-magnetic layer is an electrically insulating tunnel barrier layer.

5. The sensor of claim 1, wherein:
   the sensor is a CPP giant magneto resistive read sensor; and
   the non-magnetic layer is electrically conducting.

6. The sensor of claim 1, wherein the sensor is a tape read sensor, and the bearing surface is a tape bearing surface.

7. The sensor of claim 1, wherein the sensor is a hard drive read sensor, and the bearing surface is an air bearing surface.

8. The sensor of claim 1, further comprising additional layers that are one of: contiguous or parallel with layers of the stack, including at least two shield layers, with at least one of the shield layers on each side of the stack of layer, and parallel therewith.

9. A current-perpendicular-to-plane magnetoresistive read sensor, comprising:
   a first stack of layers, the layers extending along a stacking direction of the stack; and
   an edge surface of the stack that is parallel to the stacking direction and further parallel to and forms at least part of a bearing surface of the read sensor, the bearing surface designed to face a recording medium, in operation;
   the first stack of layers further comprising:
   a first contact layer;
   a ferromagnetic free layer having magnetic orientation that varies according to an applied magnetic field, the free layer above the first contact layer;

a non-magnetic layer above the ferromagnetic layer;
a ferromagnetic spin injection layer above the non-magnetic layer; and
a second contact layer above the spin injection layer, such that a current can flow between the second contact layer and the first contact layer along a current-perpendicular-to-plane direction, parallel to the stacking direction;
and wherein the first stack of layers further comprises a series of structures, such that each of the structures of the series is formed in both the first contact layer and the free layer, an edge surface of each of the structures level with the edge surface of the first stack, and the series of structures extends along a direction that is parallel to the bearing surface and perpendicular to the stacking direction;
the read sensor further comprising:
a second stack of layers, having structures similar to structures of the first stack of layers; and
at least three shield layers, wherein the first stack of layers and the second stack of layers are superimposed, the structures of the first stack shifted with respect to structures of the second stack along the direction parallel to the bearing surface and perpendicular to the stacking direction, at least one of the shield layers on each side of each of the first and second stacks, and parallel therewith.

10. The sensor of claim 9, wherein only one shield layer is disposed between the first stack and the second stack.

11. A current-perpendicular-to-plane magnetoresistive read sensor, comprising:
several stack of layers, the layers extending along a stacking direction of an individual stack; and
an edge surface of the stack that is parallel to the stacking direction and further parallel to and forms at least part of a bearing surface of the read sensor, the bearing surface designed to face a recording medium, in operation;
each stack of layers further comprising:
a first contact layer;
a ferromagnetic free layer having magnetic orientation that varies according to an applied magnetic field, the free layer above the first contact layer;
a non-magnetic layer above the ferromagnetic layer;
a ferromagnetic spin injection layer above the non-magnetic layer; and
a second contact layer above the spin injection layer, such that a current can flow between the second contact layer and the first contact layer along a current-perpendicular-to-plane direction, parallel to the stacking direction;
and wherein the stack of layers further comprises a series of structures, such that each of the structures of the series is formed in both the first contact layer and the free layer, an edge surface of each of the structures level with the edge surface of the stack, and the series of structures extends along a direction that is parallel to the bearing surface and perpendicular to the stacking direction;
wherein the several stacks are arranged as two superimposed linear arrays of stacks of layers, the structures of the first of the linear arrays shifted with respect to structures of the second one of the two arrays, along the direction parallel to the bearing surface and perpendicular to the stacking direction.

12. A method of fabricating a read sensor, the method comprising:
forming a stack of layers, wherein the stack of layers extending along a stacking direction of the stack, and an edge surface of the stack that is parallel to the stacking direction is further parallel to and forms at least part of a bearing surface of the read sensor, the bearing surface designed to face a recording medium, in operation;
and wherein the stack of layers comprises:
a first contact layer;
a free layer, ferromagnetic, whose magnetic orientation varies according to an applied magnetic field, the free layer above the first contact layer;
a non-magnetic layer above the ferromagnetic layer;
a spin injection layer, ferromagnetic, above the non-magnetic layer; and
a second contact layer above the spin injection layer, such that a current can flow between the second contact layer and the first contact layer along a current-perpendicular-to-plane direction, parallel to the stacking direction; and
forming a series of structures that extend along a direction that is parallel to the bearing surface and perpendicular to the stacking direction, wherein each of the structures is formed in at least the first contact layer and the free layer, such that an edge surface of each of the structures remains level with the edge surface of the stack;
wherein forming the structures comprises forming grooves, each having a main direction of extension that is perpendicular to both the bearing surface and the stacking direction, wherein the grooves are preferably formed through both the first contact layer and the free layer, a depth of the grooves extending at least up to the non-magnetic layer, the structures comprising, each, a portion of the contact layer and a portion of the free layer.

13. The method of claim 12, wherein the grooves are formed with a depth that extends at least partly into the non-magnetic layer.

* * * * *